Figure 1:
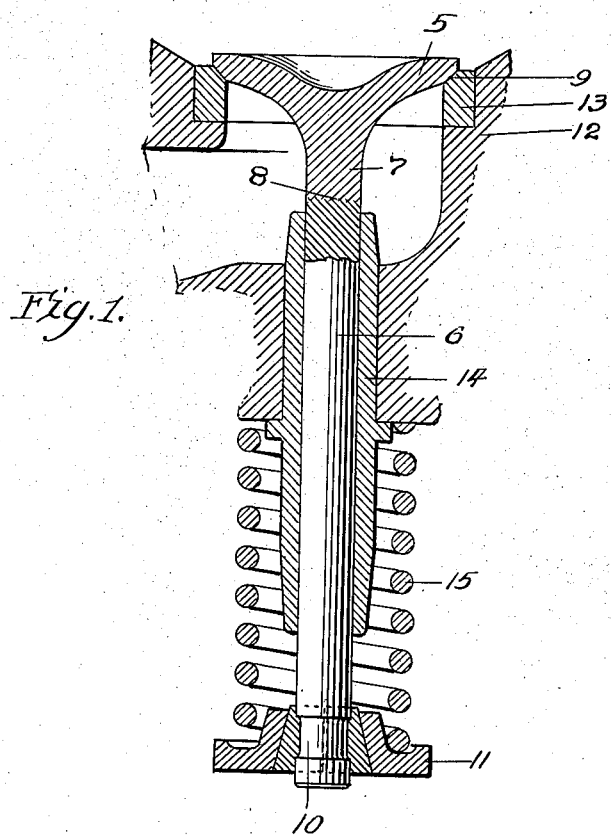

Sept. 1, 1942.  G. R. RICH  2,294,803
VALVE
Filed Feb. 18, 1942

Inventor:
George R. Rich,
by Charles O. Shurey
his Atty.

Patented Sept. 1, 1942

2,294,803

UNITED STATES PATENT OFFICE 2,294,803

VALVE

George R. Rich, Battle Creek, Mich., assignor to Rich Manufacturing Corporation, Battle Creek, Mich., a corporation of Michigan Application February 18, 1942, Serial No. 431,353

3 Claims. (Cl. 123—188)

This invention relates to valves for internal combustion engines, and it relates more particularly to valves such as are used in aeroengines, and the engines of motor propelled land vehicles and vessels. The invention has particular reference to valves that are used in high speed aircraft and tank engines which develop considerable heat during their operation, and one of the objects of this invention is the provision of a two piece valve of which the stem material has a very high value of heat conductivity, whereby the intense heat which is absorbed by the valve head is siphoned therefrom and conducted to and dissipated into the usual valve guide.

As is well known, at the moment of explosion in an internal combustion engine, the top of the head of each valve is subjected to the intense heat of the exploding gaseous mixture, and this takes place while the valve is seated and some of the heat is conducted away by the metal forming the seat for the valve. After the explosion and expansion of the gaseous mixture has taken place, and the piston has been driven down, the exhaust valve is unseated (by suitable means) and the burned gases are exhausted through the opening between the unseated valve head and its seat and discharged into and from an exhaust passage therebelow. There is a continuous flow of hot burned gases in the exhaust passage and consequently the lower face of the valve head and that part of the valve stem located above its valve guide is consequently under the influence of this intense heat, and in the ordinary valves much of this intense heat is conducted to the top of the valve head, creating what is known as a "hot spot," which sometimes causes premature ignition of the gaseous mixture.

One of the objects of this invention is to eliminate the "hot spot" and consequent pre-ignition of the gaseous mixture.

Another object is to provide a two piece valve having a valve head composed of a steel alloy having a high value of heat conductivity, and a stem integrally united with the head and composed of a different steel alloy having a considerably higher value of heat conductivity, whereby much of the heat absorbed by the head is siphoned therefrom by the valve stem and dissipated into the valve guide.

Another object is to provide a valve for use in high speed motors, such as are employed in aircraft and tanks, which is self-cooling and does not require a hollow stem containing cooling means, such as sodium.

Another object is to provide a valve for use in high speed motors with a head and neck composed of a steel alloy capable of resisting any degree of heat that the head may be exposed to in the operation of the motor and provided with a stem butt welded to the neck and composed of a steel alloy best adapted for free-acting in its valve guide and also preventing scoring and excessive wear, and preventing extreme expansion both in its length and diameter.

Another object is to provide a valve of which the stem is composed of an alloy having a very high value of heat conductivity, whereby the clearance between the stem and valve guide may be held at a minimum, in order to prevent the stem from being tilted out of alignment with the bore of the valve guide by the usual valve seating spring.

The common sodium cooled valve requires considerable clearance in the valve guide, as much as .006 of an inch or more, with the result that the stem is tilted by the spring, causing one side of the upper end of the stem to bear against the upper edge of the upper end of the bore of the valve guide at one side edge, and the opposite side of the lower end of the stem to bear against the other side edge of the lower end of the bore. This not only causes excessive wear along two short lengths of the stem, but it allows carbon and other foreign matter to enter the clearance space and clog the same, sometimes causing the stem to stick in the valve guide.

The tilting of the stem causes one side of the seating face of the valve head to seat first, thereby allowing a gap between the opposite side of the seating face of the valve head and the seat through which a part of the charge may escape before the spring effectively seats the whole valve head. This has the effect of decreasing the efficiency of the motor.

With my present valve a clearance of from .002 to .003 of an inch is all that is required, consequently the stem cannot be appreciably tilted but remains in substantially true alignment with the axis of the bore in the valve guide, and as a result the above mentioned serious difficulties are wholly eliminated.

Another object is to provide a valve composed of a combination of steel alloys that are highly resistant to corrosion and oxidation.

I have discovered that certain steel alloys containing ascertained proportions of carbon, silicon, manganese, chromium and nickel, and optionally molybdenum and tungsten, have a very high value of heat conductivity and are resistant to corrosion from the oxidizing and corrosive attack of hot exhaust gases. Furthermore, the head portions of valves and the stems, made of these respective steel alloys, are capable of being butt welded together to form an integral piece, and if desired the stem may be hardened to resist the wear upon it.

With these ends in view, this invention consists in a valve composed of a head and a stem integrally united therewith, the head being composed of a steel alloy having a high value of heat conductivity and the stem composed of a steel alloy having a considerably higher value of heat conductivity, whereby heat may be siphoned from the head by the stem and dissipated into the valve guide without the use of a cooling medium, such as sodium. The invention further consists in the several novel features hereinafter more fully set forth and claimed.

Figure 2:
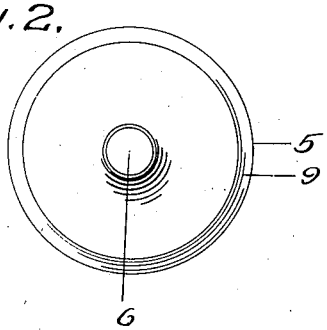

The invention is clearly illustrated in the drawing accompanying this specification, in which:

Fig. 1 is a side elevation, partly in central longitudinal section of a valve embodying one form of the present invention, installed in a fragment of a cylinder block which is shown in cross section; and Fig. 2 is an end view of the valve.

Referring to said drawing, the reference character 5 designates the head of the valve and 6 the stem thereof. The head may be of any desirable shape, and it is here shown as of "tulip" form. Desirably, the head is formed with a short neck 7, to which one end of the valve stem is butt welded or otherwise integrally united therewith as at 8.

The head is formed with the usual tapered seating face 9, and the stem is provided with the usual groove 10 for a spring retaining element 11.

As is well understood, the cylinder block 12 of an internal combustion engine is formed with inlet and exhaust ports that are controlled by the valves and that the head of each valve seats upon a tapered seat usually formed on a ring insert 13, disposed around the port, and that the valve stem slides in a valve guide usually provided with bushing 14, with the valve head yieldably held upon the seat by a spring 15.

In the manufacture of my present two piece valve, a short rod, composed of the steel alloy for the head, of the length required to form the head and neck is butt welded to a short rod, composed of the steel alloy for the stem, and of a length required to form the stem. The head end is heated and upset to form an enlargement, and thereafter heated and forged into the shape of the head. The rough piece is machined and ground to size and if desired, the stem is hardened in any approved manner.

The steel alloy of the head of the valve is composed of carbon, silicon, manganese, chromium, nickel, phosphorus, sulphur and iron, and optionally tungsten, and the steel alloy of the stem is composed of the same alloy metals, except that for tungsten, molybdenum may be substituted. Specifically the ingredients of the two pieces of the valve and their proportions are as follows:

| Type | C | Si | Mn | Cr | Ni | Mo | W | P | S |
|---|---|---|---|---|---|---|---|---|---|
| Head | 0.20 | 1.10 | 1.10 | 21.0 | 11.0 | | 2.25 | 0.025 | 0.025 |
| Stem | 0.30 | 3.25 | 1.00 | 7.50 | 2.0 | 0.60 | | 0.025 | 0.025 | the remainder in each case being iron.

The proportions of the above specified alloying elements may be varied slightly, but in order to obtain the best results the proportions should be kept within a very close range to the ones specified.

The co-efficient of thermal conductivity ($K_t$) is generally expressed as the number of heat units (B. t. u.) given off by the material per hour, per degree F., per square foot, per unit thickness.

Tests made on bars of steel alloys used in the manufacture of my valves, as shown by the following chart, indicate the number of heat units given off per hour:

| Steel | Upper temp. | Lower temp. | Mean temp. | $K_t$ |
|---|---|---|---|---|
| | °F. | °F. | °F. | |
| Head | 642 | 308 | 475 | 73.1 |
| | 958 | 308 | 633 | 75.7 |
| | 958 | 642 | 800 | 78.4 |
| Stem | 582 | 273 | 428 | 144 |
| | 880 | 273 | 577 | 147 |
| | 880 | 582 | 731 | 151 |

Another well known valve steel, under the same range of temperature has a heat conductivity of 43.6 to 45.8 ($K_t$).

These tests show a higher value of heat conductivity for the stem material than well known steel alloys used in the manufacture of valves for the stem material; the value of the heat conductivity of the steel alloy for the stem portion of the valve is almost twice as great as that of the head portion.

From the above, it is apparent that with the use of the combination of the two steel alloys, above specified, in the manufacture of valves, a cooler valve head is maintained and the danger of pre-ignition is eliminated. Furthermore, the valve effectively resists corrosion, oxidation, warping, wear and tear and has a minimum amount of expansion.

Furthermore, the clearance space between the valve stem and its guide is reduced to a minimum, thereby eliminating the possibility of any appreciable amount of tilting of the stem, and excessive wear along short lengths thereof. Furthermore, the heat conducted by the stem is more readily dissipated into the valve guide.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. A valve comprising a head composed of a steel alloy consisting of the following ingredients in about the following proportions: carbon 0.20%, silicon 1.10%, manganese 1.10%, chromium 21.0%, nickel 11.0%, and the principal part of the remainder, iron, in combination with a valve stem butt welded to the head and composed of a steel alloy consisting of the following ingredients in about the following proportions: carbon 0.30%, silicon 3.25%, manganese 1.00%, chromium 7.50%, nickel 2.0%, and the principal part of the remainder, iron.

2. A valve comprising a head composed of a steel alloy consisting of the following ingredients in about the following proportions: carbon 0.20%, silicon 1.10%, manganese 1.10%, chromium 21.0%, nickel 11.0%, tungsten 2.25%, phosphorus 0.025%, sulphur 0.025%, and the remainder, iron, in combination with a valve stem butt welded to the head and composed of a steel alloy consisting of the following ingredients in about the following proportions: carbon 0.30%, silicon 3.25%, manganese 1.00%, chromium 7.50%, nickel 2.0%, molybdenum 0.60%, phosphorus 0.025%, sulphur 0.025%, and the remainder, iron.

3. An exhaust valve for high speed internal combustion engines for operation in a valve guide, said valve comprising a head formed with a neck, and a stem butt welded to said neck, the head with its neck and the stem being composed of different steel alloys containing carbon not over .30%, silicon not over 3.25%, manganese not over 1.10%, chromium not over 21.0%, nickel not over 11.0%, and the principal part of the remainder, iron, the carbon content in the stem being slightly greater than that in the head and neck, the silicon content in the stem being approximately three times that in the head and neck, the manganese content being substantially the same in the stem, head and neck, the chromium content in the stem being approximately one-third of that in the head and neck, and the nickel content in the stem being approximately one-fifth of that in the head and neck, whereby the value of the heat conductivity of the stem is substantially higher than that of the head and neck, whereby heat is siphoned from the head by the stem and dissipated into said valve guide.

GEORGE R. RICH.